(12) United States Patent
Abdo

(10) Patent No.: US 8,760,453 B2
(45) Date of Patent: Jun. 24, 2014

(54) ADAPTIVE GRID GENERATION FOR IMPROVED CACHING AND IMAGE CLASSIFICATION

(75) Inventor: Nadim Y. Abdo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 302 days.

(21) Appl. No.: 12/873,769

(22) Filed: Sep. 1, 2010

(65) Prior Publication Data

US 2012/0050298 A1 Mar. 1, 2012

(51) Int. Cl.
*G06F 15/00* (2006.01)

(52) U.S. Cl.
USPC .......................................... 345/501

(58) Field of Classification Search
CPC ... G06T 11/40; G06T 15/005; G06T 2200/16; H04N 19/00412
See application file for complete search history.

(56) References Cited

U.S. PATENT DOCUMENTS

| | | | | |
|---|---|---|---|---|
| 6,748,111 | B1 * | 6/2004 | Stolin et al. | 382/176 |
| 6,754,396 | B1 * | 6/2004 | Childers | 382/259 |
| 7,274,380 | B2 * | 9/2007 | Navab et al. | 345/633 |
| 7,336,825 | B2 * | 2/2008 | Jacobs | 382/172 |
| 7,477,792 | B2 * | 1/2009 | Wu et al. | 382/240 |
| 7,512,274 | B2 * | 3/2009 | Simard et al. | 382/195 |
| 7,512,494 | B2 * | 3/2009 | Nishiuchi | 701/300 |
| 8,026,928 | B2 | 9/2011 | Takano et al. | |
| 2005/0022135 | A1 | 1/2005 | de Waal | |
| 2005/0062988 | A1 | 3/2005 | Schultz et al. | |
| 2005/0068290 | A1 | 3/2005 | Jaeger | |
| 2005/0237321 | A1 | 10/2005 | Young et al. | |
| 2006/0253775 | A1 | 11/2006 | Ovetchkine et al. | |
| 2006/0259872 | A1 | 11/2006 | Mullen et al. | |
| 2007/0274599 | A1 * | 11/2007 | Ishikawa | 382/232 |
| 2008/0022197 | A1 | 1/2008 | Bargeron et al. | |

(Continued)

FOREIGN PATENT DOCUMENTS

| | | |
|---|---|---|
| CN | 1677343 A | 10/2005 |
| CN | 101192138 A | 6/2008 |
| CN | 101650824 A | 2/2010 |
| EP | 1439485 A1 | 7/2004 |

OTHER PUBLICATIONS

"Use Automatic Layout Overview", www.msdn.microsoft.com-en-us-library-ms748828(printer).aspx, .Net Framework 4—Windows Presentation Foundation, accessed Jul. 26, 2010, 4 pages.

(Continued)

*Primary Examiner* — Kee M Tung
*Assistant Examiner* — Frank Chen
(74) *Attorney, Agent, or Firm* — Tony Azure; Andrew Sanders; Micky Minhas

(57) ABSTRACT

Example embodiments of the present disclosure provide mechanisms for generating an improved grid for use in caching and classification when transmitting graphics data to a client computer. Such a grid may have the property that it is aligned to captured screen content such as user interface elements and borders between images and text. In some embodiments, an algorithm may be used that analyzes a screen and generates a subdivision grid of the screen that is likely to partition the screen into areas that substantially separate image and text content. This subdivision grid can also be further sub-divided (i.e., tiled) into regions that may be better suited for caching. In further embodiments, the algorithm may produce the grid using information from a window manager regarding window hierarchies and user interface element placement.

19 Claims, 14 Drawing Sheets

(56) References Cited

U.S. PATENT DOCUMENTS

2009/0037441 A1* 2/2009 Howell et al. ............... 707/100
2009/0106648 A1   4/2009 Mogilevsky et al.
2009/0185083 A1* 7/2009 Ohtoshi et al. ............. 348/740
2009/0262190 A1* 10/2009 Dotchevski et al. .......... 348/143

OTHER PUBLICATIONS

Chinese Patent Application No. 201110266495.9: Office Action dated Nov. 15, 2013, 13 pages.

* cited by examiner

ADAPTIVE GRID GENERATION FOR IMPROVED CACHING AND IMAGE CLASSIFICATION

BACKGROUND

One increasingly popular form of networking may generally be referred to as remote presentation systems, which can use protocols such as Remote Desktop Protocol (RDP) and Independent Computing Architecture (ICA) to share a desktop and other applications executing on a server with a remote client. Such computing systems typically transmit the keyboard presses and mouse clicks or selections from the client to the server, relaying the screen updates back in the other direction over a network connection (e.g., the Internet). As such, the user has the experience as if his or her machine is operating entirely locally, when in reality the client device is only sent screenshots of the desktop or applications as they appear on the server side.

In such systems, the user graphics and video may be rendered at a server for each user. The resulting bitmaps may then be sent to the client for display and interaction. To reduce the bandwidth requirements on the network, bitmaps may be compressed and encoded before sending to the client. The encoding system may include a tiling system that initially divides source image data into data tiles. A frame differencing module may then output only altered data tiles to various processing modules that convert the altered data tiles into corresponding tile components.

SUMMARY

One problem with remote presentation systems that employs such a tiling scheme is the scenario where the changed areas of a screen are not fully aligned on a tile when the tiles are a predetermined size and generated using a fixed origin. For example, a tile may comprise both video and text portions or sub-regions. Treating the entire tile as a slow changing text portion may result in the system being unable to provide updates fast enough to keep up with the faster changing video portion. Treating the entire tile as fast changing may result in the text portion being rendered with a lesser quality image. When an algorithm for scalable encoding is performed, the higher fidelity image may appear to be fuzzy because only the high frequency components may be sent as a result of the video being repeatedly updated. Furthermore, when using bit map caching, tiles are stored in a cache and when a tile in a subsequent frame is identical to a previously cached tile, then the cached tile can be used (referred to as a cache hit). However, if a user screen is scrolled or otherwise moved in reference to the screen origin, then it is possible that cache hits will not be identified even if the screen is substantially unchanged.

Accordingly, disclosed herein is a mechanism for generating a more suitable grid for both caching and classification. Such a grid may have the property that it is aligned to screen content such as user interface elements and borders between images and text. In some embodiments, an algorithm may be used that analyzes a screen and generates a subdivision grid of the screen that is likely to partition the screen into areas that substantially separate image and text content. This subdivision grid can also be further sub-divided (i.e., tiled) into regions that may be better suited for caching. In further embodiments, the algorithm may produce the grid using information from a window manager regarding window hierarchies and user interface element placement.

For example, methods and systems are disclosed for processing graphics data for transmission to a remote computing device. An example method may comprise receiving graphics data representative of a client screen to be transmitted to the remote computing device; determining anchor points in the graphics data, wherein the anchor points are indicative of transitions between visual elements of the client screen; based on the anchor points, determining a grid for subdividing the client screen, wherein the grid is substantially aligned to user interface elements and border between images and text of said client screen; and based on the grid, dividing the graphics data into data tiles and processing said data tiles for transmission to the remote computing device.

BRIEF DESCRIPTION OF THE DRAWINGS

The systems, methods, and computer readable media for graphics data for transmission to a remote computing device in accordance with this specification are further described with reference to the accompanying drawings in which.

DETAILED DESCRIPTION

Computing Environments in General Terms

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a terminal server. The application processes the input as if the input were entered at the terminal server. The application generates output in response to the received input and the output is transferred over the network to the client.

Figure 1:
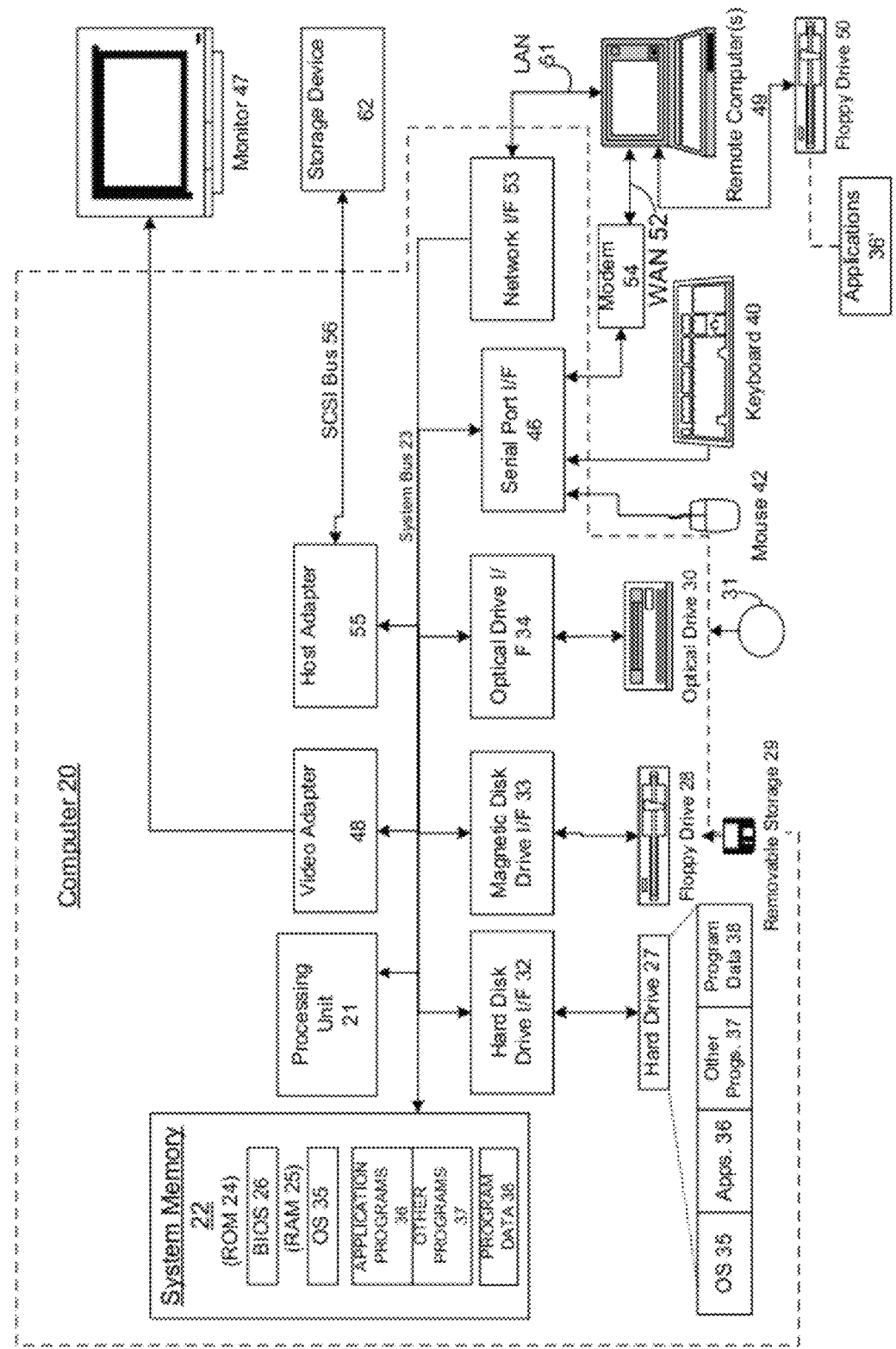
FIGS. 1 and 2 depict an example computer system wherein aspects of the present disclosure can be implemented.
Figure 2:
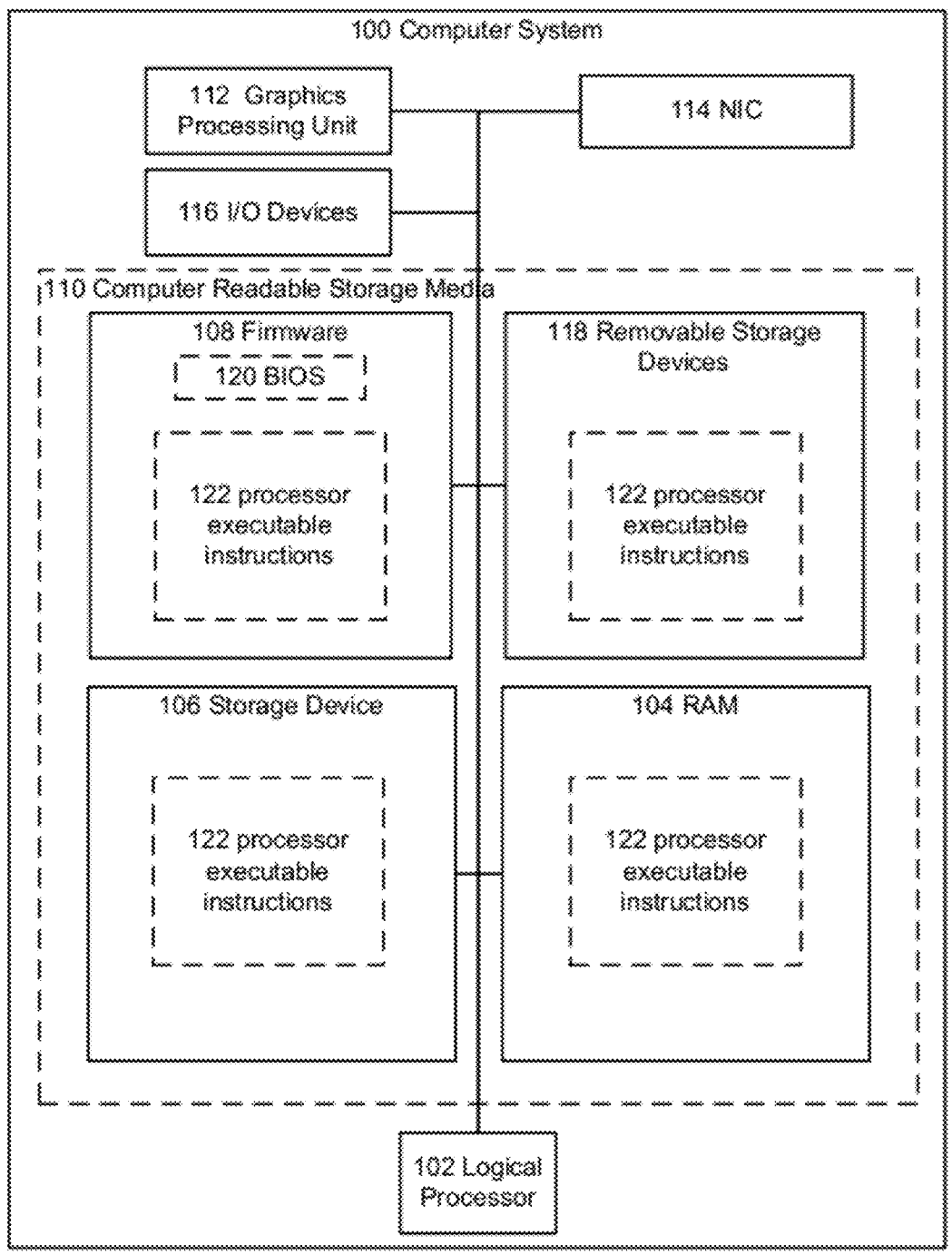

Embodiments may execute on one or more computers. FIGS. 1 and 2 and the following discussion are intended to provide a brief general description of a suitable computing environment in which the disclosure may be implemented. One skilled in the art can appreciate that computer systems 200, 300 can have some or all of the components described with respect to computer 100 of FIGS. 1 and 2.

The term circuitry used throughout the disclosure can include hardware components such as hardware interrupt controllers, hard drives, network adaptors, graphics processors, hardware based video/audio codecs, and the firmware/software used to operate such hardware. The term circuitry can also include microprocessors configured to perform function(s) by firmware or by switches set in a certain way or one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is trivial and left to an implementer.

FIG. 1 depicts an example of a computing system which is configured to with aspects of the disclosure. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the disclosure may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the disclosure are particularly well-suited for computer systems, nothing in this document is intended to limit the disclosure to such embodiments.

Referring now to FIG. 2, another embodiment of an exemplary computing system 100 is depicted. Computer system 100 can include a logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by one or more system busses which couples various system components to the logical processor 102. The system buses may be any of several types of bus structures including a memory bus or memory controller, a peripheral bus, and a local bus using any of a variety of bus architectures. In example embodiments the computer readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, Bernoulli cartridges.

The computer readable storage media provide non volatile storage of processor executable instructions 122, data structures, program modules and other data for the computer 100. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to the logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processor 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a terminal server. The application processes the input as if the input were entered at the terminal server. The application generates output in response to the received input and the output is transferred over the network to the client computer system. The client computer system presents the output data. Thus, input is received and output presented at the client computer system, while processing actually occurs at the terminal server. A session can include a shell and a user interface such as a desktop, the subsystems that track mouse movement within the desktop, the subsystems that translate a mouse click on an icon into commands that effectuate an instance of a program, etc. In another example embodiment the session can include an application. In this example while an application is rendered, a desktop environment may still be generated and hidden from the user. It should be understood that the foregoing discussion is exemplary and that the presently disclosed subject matter may be implemented in various client/server environments and not limited to a particular terminal services product.

In most, if not all remote desktop environments, input data (entered at a client computer system) typically includes mouse and keyboard data representing commands to an application and output data (generated by an application at the terminal server) typically includes video data for display on a video output device. Many remote desktop environments also include functionality that extend to transfer other types of data.

Communications channels can be used to extend the RDP protocol by allowing plug-ins to transfer data over an RDP connection. Many such extensions exist. Features such as printer redirection, clipboard redirection, port redirection, etc., use communications channel technology. Thus, in addition to input and output data, there may be many communications channels that need to transfer data. Accordingly, there may be occasional requests to transfer output data and one or more channel requests to transfer other data contending for available network bandwidth.

Figure 3:
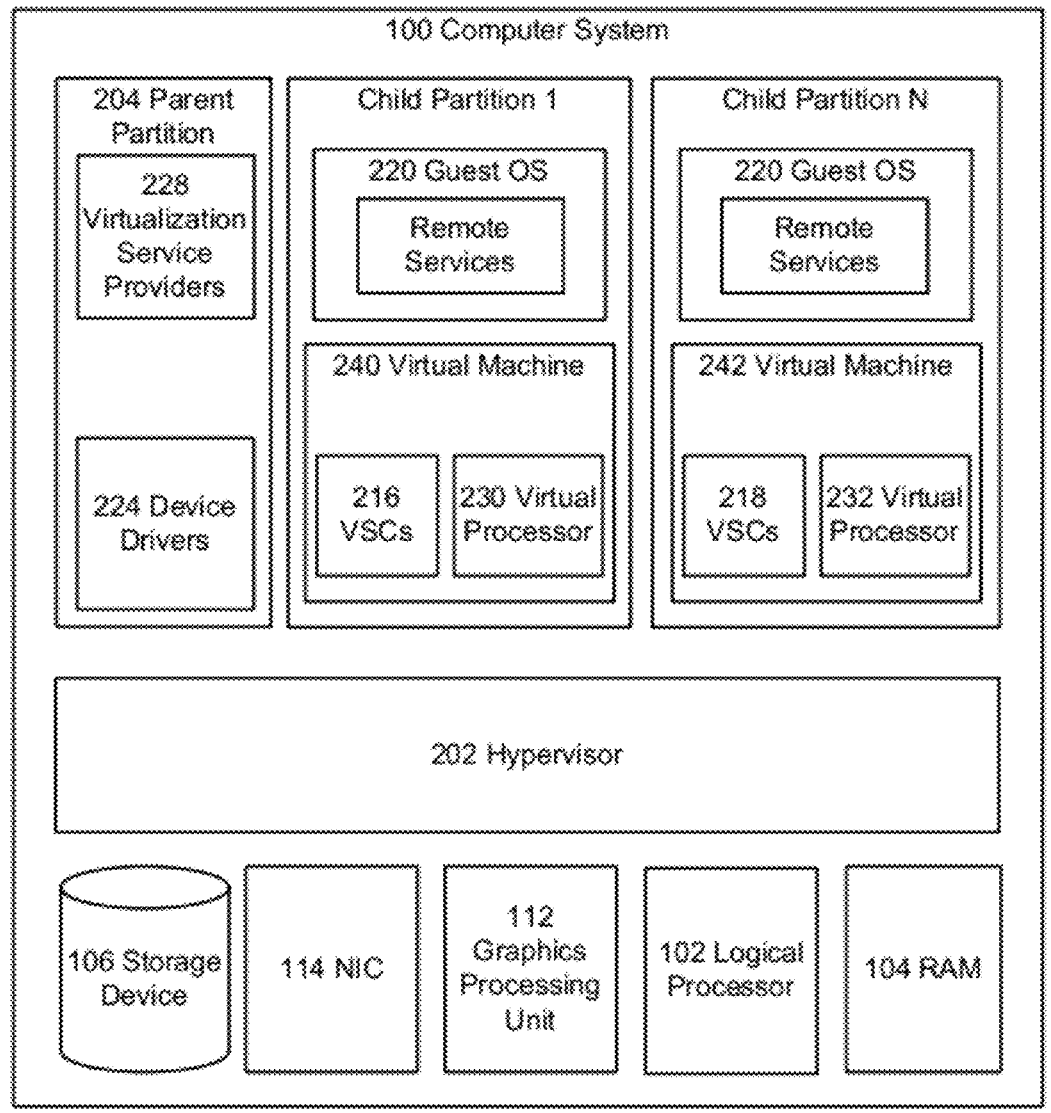
FIG. 3 depicts an operational environment for practicing aspects of the present disclosure.
Figure 4:
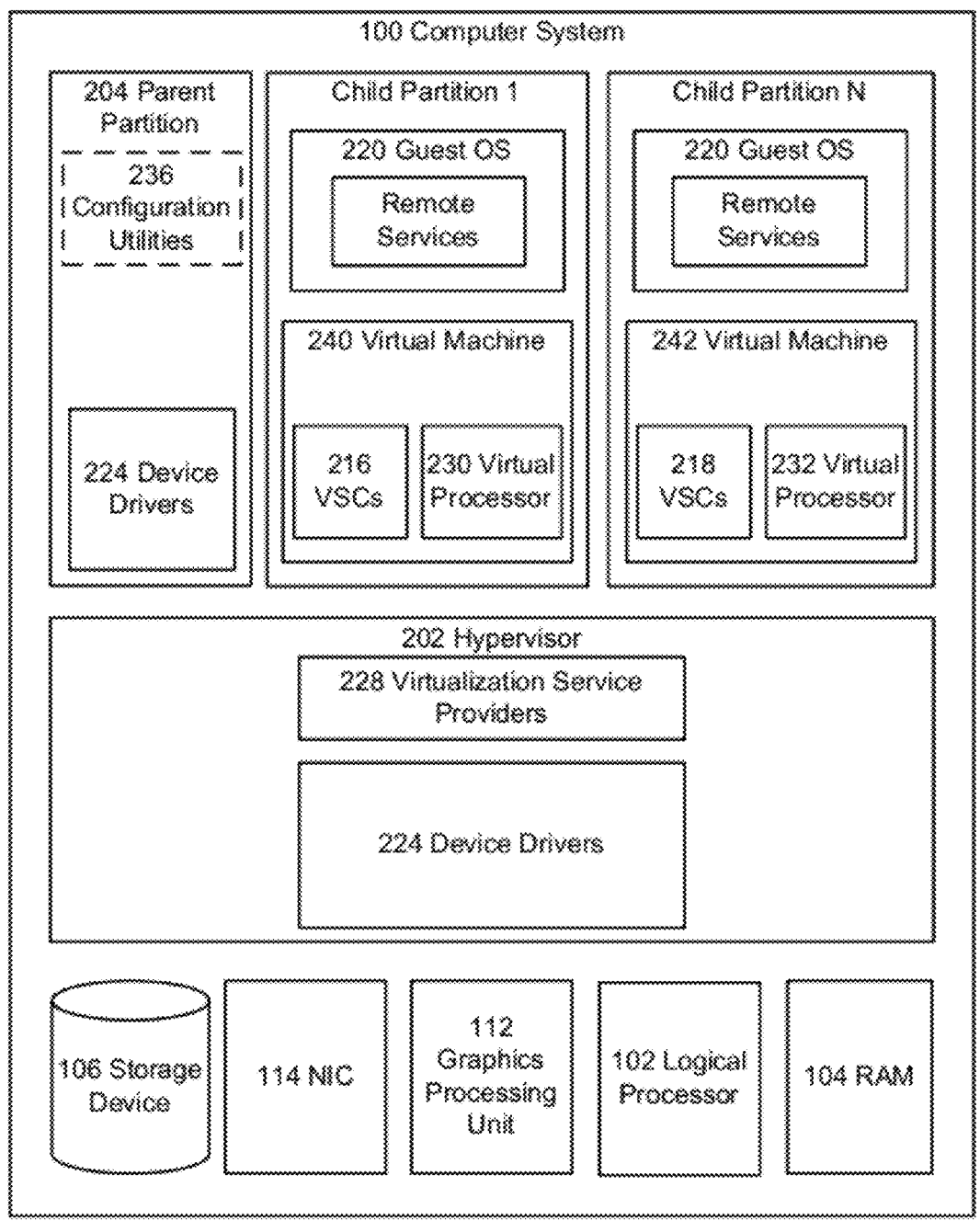
FIG. 4 depicts an operational environment for practicing aspects of the present disclosure.

Referring now to FIGS. 3 and 4, depicted are high level block diagrams of computer systems configured to effectuate virtual machines. As shown in the figures, computer system 100 can include elements described in FIGS. 1 and 2 and components operable to effectuate virtual machines. One such component is a hypervisor 202 that may also be referred to in the art as a virtual machine monitor. The hypervisor 202 in the depicted embodiment can be configured to control and arbitrate access to the hardware of computer system 100. Broadly stated, the hypervisor 202 can generate execution environments called partitions such as child partition 1 through child partition N (where N is an integer greater than or equal to 1). In embodiments a child partition can be considered the basic unit of isolation supported by the hypervisor 202, that is, each child partition can be mapped to a set of hardware resources, e.g., memory, devices, logical processor cycles, etc., that is under control of the hypervisor 202 and/or the parent partition and hypervisor 202 can isolate one partition from accessing another partition's resources. In embodiments the hypervisor 202 can be a stand-alone software product, a part of an operating system, embedded within firmware of the motherboard, specialized integrated circuits, or a combination thereof.

In the above example, computer system 100 includes a parent partition 204 that can also be thought of as domain 0 in the open source community. Parent partition 204 can be configured to provide resources to guest operating systems executing in child partitions 1-N by using virtualization service providers 228 (VSPs) that are also known as back-end drivers in the open source community. In this example architecture the parent partition 204 can gate access to the underlying hardware. The VSPs 228 can be used to multiplex the interfaces to the hardware resources by way of virtualization service clients (VSCs) that are also known as front-end drivers in the open source community. Each child partition can include one or more virtual processors such as virtual processors 230 through 232 that guest operating systems 220 through 222 can manage and schedule threads to execute thereon. Generally, the virtual processors 230 through 232 are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in these example embodiments, multiple virtual processors can be simultaneously executing while, for example, another logical processor is executing hypervisor instructions. Generally speaking, and as illustrated by the figures, the combination of virtual processors, various VSCs, and memory in a partition can be considered a virtual machine such as virtual machine 240 or 242.

Generally, guest operating systems 220 through 222 can include any operating system such as, for example, operating systems from Microsoft®, Apple®, the open source community, etc. The guest operating systems can include user/kernel modes of operation and can have kernels that can include schedulers, memory managers, etc. A kernel mode can include an execution mode in a logical processor that grants access to at least privileged processor instructions. Each guest operating system 220 through 222 can have associated file systems that can have applications stored thereon such as terminal servers, e-commerce servers, email servers, etc., and the guest operating systems themselves. The guest operating systems 220-222 can schedule threads to execute on the virtual processors 230-232 and instances of such applications can be effectuated.

Referring now to FIG. 4, illustrated is an alternative architecture that can be used to effectuate virtual machines. FIG. 4 depicts similar components to those of FIG. 3, however in this example embodiment the hypervisor 202 can include the virtualization service providers 228 and device drivers 224, and parent partition 204 may contain configuration utilities 236. In this architecture, hypervisor 202 can perform the same or similar functions as the hypervisor 202 of FIG. 2. The hypervisor 202 of FIG. 4 can be a stand alone software product, a part of an operating system, embedded within firmware of the motherboard or a portion of hypervisor 202 can be effectuated by specialized integrated circuits. In this example parent partition 204 may have instructions that can be used to configure hypervisor 202 however hardware access requests may be handled by hypervisor 202 instead of being passed to parent partition 204.

Figure 5:
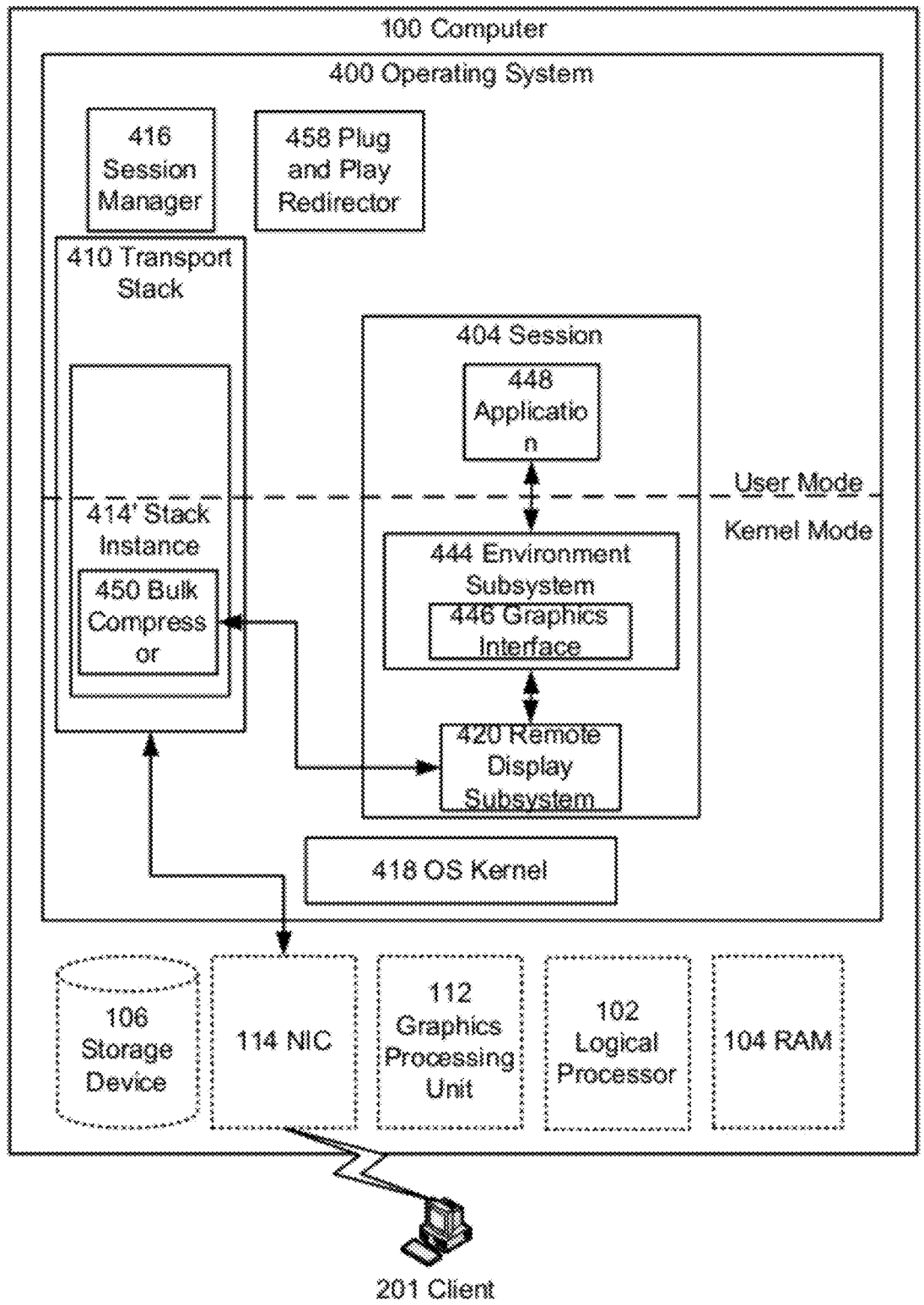
FIG. 5 illustrates a computer system including circuitry for effectuating remote desktop services.

Referring now to FIG. 5, computer 100 may include circuitry configured to provide remote desktop services to connecting clients. In an example embodiment, the depicted operating system 400 may execute directly on the hardware or a guest operating system 220 or 222 may be effectuated by a virtual machine such as VM 216 or VM 218. The underlying hardware 208, 210, 234, 212, and 214 is indicated in the illustrated type of dashed lines to identify that the hardware can be virtualized.

Remote services can be provided to at least one client such as client 401 (while one client is depicted remote services can be provided to more clients.) The example client 401 can include a computer terminal that is effectuated by hardware configured to direct user input to a remote server session and display user interface information generated by the session. In another embodiment, client 401 can be effectuated by a computer that includes similar elements as those of computer 100 FIG. 1b. In this embodiment, client 401 can include circuitry configured to effect operating systems and circuitry configured to emulate the functionality of terminals, e.g., a remote desktop client application that can be executed by one or more logical processors 102. One skilled in the art can appreciate that the circuitry configured to effectuate the operating system can also include circuitry configured to emulate a terminal.

Each connecting client can have a session (such as session 404) which allows the client to access data and applications stored on computer 100. Generally, applications and certain operating system components can be loaded into a region of memory assigned to a session. Thus, in certain instances some OS components can be spawned N times (where N represents the number of current sessions). These various OS components can request services from the operating system kernel 418 which can, for example, manage memory; facilitate disk reads/writes; and configure threads from each session to execute on the logical processor 102. Some example subsystems that can be loaded into session space can include the subsystems that generates desktop environments, the subsystems that track mouse movement within the desktop, the subsystems that translate mouse clicks on icons into commands that effectuate an instance of a program, etc. The processes that effectuate these services, e.g., tracking mouse movement, are tagged with an identifier associated with the session and are loaded into a region of memory that is allocated to the session.

A session can be generated by a session manager 416, e.g., a process. For example, the session manager 416 can initialize and manage each remote session by generating a session identifier for a session space; assigning memory to the session space; and generating system environment variables and instances of subsystem processes in memory assigned to the session space. The session manager 416 can be invoked when a request for a remote desktop session is received by the operating system 400.

A connection request can first be handled by a transport stack 410, e.g., a remote desktop protocol (RDP) stack. The transport stack 410 instructions can configure logical processor 102 to listen for connection messages on a certain port and forward them to the session manager 416. When sessions are generated the transport stack 410 can instantiate a remote desktop protocol stack instance for each session. Stack instance 414 is an example stack instance that can be generated for session 404. Generally, each remote desktop protocol stack instance can be configured to route output to an associated client and route client input to an environment subsystem 444 for the appropriate remote session.

As shown by the figure, in an embodiment an application 448 (while one is shown others can also execute) can execute and generate an array of bits. The array can be processed by a graphics interface 446 which in turn can render bitmaps, e.g., arrays of pixel values, that can be stored in memory. As shown by the figure, a remote display subsystem 420 can be instantiated which can capture rendering calls and send the calls over the network to client 401 via the stack instance 414 for the session.

In addition to remoting graphics and audio, a plug and play redirector 458 can also be instantiated in order to remote diverse devices such as printers, mp3 players, client file systems, CD ROM drives, etc. The plug and play redirector 458 can receive information from a client side component which identifies the peripheral devices coupled to the client 401. The plug and play redirector 458 can then configure the operating system 400 to load redirecting device drivers for the peripheral devices of the client 401. The redirecting device drivers can receive calls from the operating system 400 to access the peripherals and send the calls over the network to the client 401.

As discussed above, clients may use a protocol for providing remote presentation services such as Remote Desktop Protocol (RDP) to connect to a resource using terminal services. When a remote desktop client connects to a terminal server via a terminal server gateway, the gateway may open a socket connection with the terminal server and redirect client traffic on the remote presentation port or a port dedicated to remote access services. The gateway may also perform certain gateway specific exchanges with the client using a terminal server gateway protocol transmitted over HTTPS.

Figure 6:
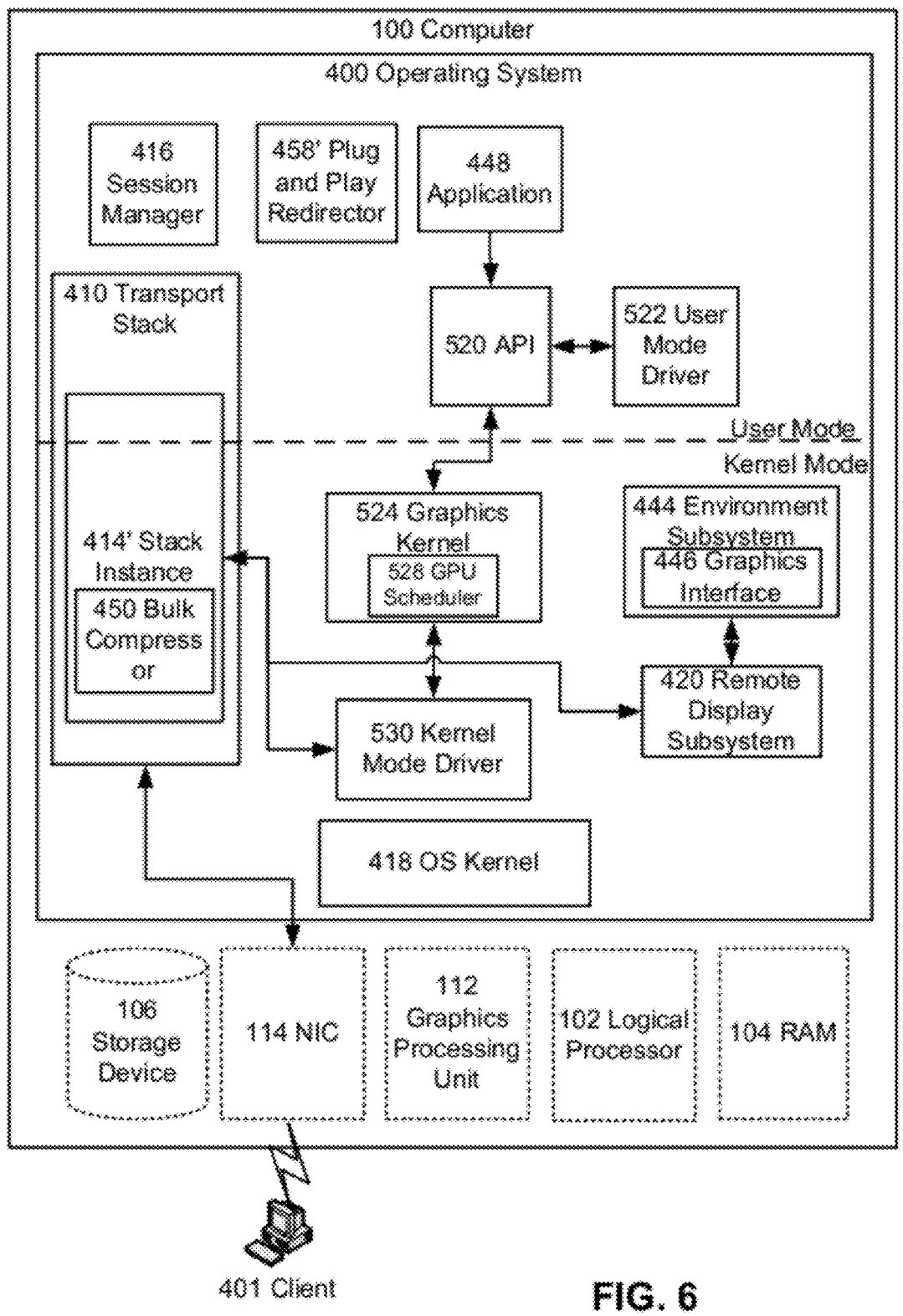
FIG. 6 illustrates a computer system including circuitry for effectuating remote services.

Turning to FIG. 6, depicted is a computer system 100 including circuitry for effectuating remote services and for incorporating aspects of the present disclosure. As shown by the figure, in an embodiment a computer system 100 can include components similar to those described in FIG. 2 and FIG. 5, and can effectuate a remote presentation session. In an embodiment of the present disclosure a remote presentation session can include aspects of a console session, e.g., a session spawned for a user using the computer system, and a remote session. Similar to that described above, the session manager 416 can initialize and manage the remote presentation session by enabling/disabling components in order to effectuate a remote presentation session.

One set of components that can be loaded in a remote presentation session are the console components that enable high fidelity remoting, namely, the components that take advantage of 3D graphics and 2D graphics rendered by 3D hardware.

3D/2D graphics rendered by 3D hardware can be accessed using a driver model that includes a user mode driver 522, an API 520, a graphics kernel 524, and a kernel mode driver 530. An application 448 (or any other process such as a user interface that generates 3D graphics) can generate API constructs and send them to an application programming interface 520 (API) such as Direct3D from Microsoft®. The API 520 in turn can communicate with a user mode driver 522 which can generates primitives, e.g., the fundamental geometric shapes used in computer graphics represented as vertices and constants which are used as building blocks for other shapes, and stores them in buffers, e.g., pages of memory. In one embodiment the application 448 can declare how it is going to use the buffer, e.g., what type of data it is going to store in the buffer. An application, such as a videogame, may use a dynamic buffer to store primitives for an avatar and a static buffer for storing data that will not change often such as data that represents a building or a forest.

Continuing with the description of the driver model, the application can fill the buffers with primitives and issue execute commands. When the application issues an execute command the buffer can be appended to a run list by the kernel mode driver 530 and scheduled by the graphics kernel scheduler 528. Each graphics source, e.g., application or user interface, can have a context and its own run list. The graphics kernel 524 can be configured to schedule various contexts to execute on the graphics processing unit 112. The GPU scheduler 528 can be executed by logical processor 102 and the scheduler 528 can issue a command to the kernel mode driver 530 to render the contents of the buffer. The stack instance 414 can be configured to receive the command and send the contents of the buffer over the network to the client 401 where the buffer can be processed by the GPU of the client.

Illustrated now is an example of the operation of a virtualized GPU as used in conjunction with an application that calls for remote presentation services. Referring to FIG. 6, in an embodiment a virtual machine session can be generated by a computer 100. For example, a session manager 416 can be executed by a logical processor 102 and a remote session that includes certain remote components can be initialized. In this example the spawned session can include a kernel 418, a graphics kernel 524, a user mode display driver 522, and a kernel mode display driver 530. The user mode driver 522 can generate graphics primitives that can be stored in memory. For example, the API 520 can include interfaces that can be exposed to processes such as a user interface for the operating system 400 or an application 448. The process can send high level API commands such as such as Point Lists, Line Lists, Line Strips, Triangle Lists, Triangle Strips, or Triangle Fans, to the API 420. The API 520 can receive these commands and translate them into commands for the user mode driver 522 which can then generate vertices and store them in one or more buffers. The GPU scheduler 528 can run and determine to render the contents of the buffer. In this example the command to the graphics processing unit 112 of the server can be captured and the content of the buffer (primitives) can be sent to client 401 via network interface card 114. In an embodiment, an API can be exposed by the session manager 416 that components can interface with in order to determine whether a virtual GPU is available.

In an embodiment a virtual machine such as virtual machine 240 of FIG. 3 or 4 can be instantiated and the virtual machine can serve as a platform for execution for the operating system 400. Guest operating system 220 can embody operating system 400 in this example. A virtual machine may be instantiated when a connection request is received over the network. For example, the parent partition 204 may include an instance of the transport stack 410 and may be configured to receive connection requests. The parent partition 204 may initialize a virtual machine in response to a connection request along with a guest operating system including the capabilities to effectuate remote sessions. The connection request can then be passed to the transport stack 410 of the guest operating system 220. In this example each remote session may be instantiated on an operating system that is executed by its own virtual machine.

In one embodiment a virtual machine can be instantiated and a guest operating system 220 embodying operating system 400 can be executed. Similar to that described above, a virtual machine may be instantiated when a connection request is received over the network. Remote sessions may be generated by an operating system. The session manager 416 can be configured to determine that the request is for a session that supports 3D graphics rendering and the session manager 416 can load a console session. In addition to loading the console session the session manager 416 can load a stack instance 414' for the session and configure system to capture primitives generated by a user mode display driver 522.

The user mode driver 522 may generate graphics primitives that can be captured and stored in buffers accessible to the transport stack 410. A kernel mode driver 530 can append the buffers to a run list for the application and a GPU scheduler 528 can run and determine when to issue render commands for the buffers. When the scheduler 528 issues a render command the command can be captured by, for example, the kernel mode driver 530 and sent to the client 401 via the stack instance 414'.

The GPU scheduler 528 may execute and determine to issue an instruction to render the content of the buffer. In this example the graphics primitives associated with the instruction to render can be sent to client 401 via network interface card 114.

In an embodiment, at least one kernel mode process can be executed by at least one logical processor 112 and the at least one logical processor 112 can synchronize rendering vertices stored in different buffers. For example, a graphics processing scheduler 528, which can operate similarly to an operating system scheduler, can schedule GPU operations. The GPU scheduler 528 can merge separate buffers of vertices into the correct execution order such that the graphics processing unit of the client 401 executes the commands in an order that allows them to be rendered correctly.

One or more threads of a process such as a videogame may map multiple buffers and each thread may issue a draw command. Identification information for the vertices, e.g., information generated per buffer, per vertex, or per batch of vertices in a buffer, can be sent to the GPU scheduler 528. The information may be stored in a table along with identification information associated with vertices from the same, or other processes and used to synchronize rendering of the various buffers.

An application such as a word processing program may execute and declare, for example, two buffers—one for storing vertices for generating 3D menus and the other one storing commands for generating letters that will populate the menus. The application may map the buffer and; issue draw commands. The GPU scheduler 528 may determine the order for executing the two buffers such that the menus are rendered along with the letters in a way that it would be pleasing to look at. For example, other processes may issue draw commands at the same or a substantially similar time and if the vertices were not synchronized vertices from different threads of different processes could be rendered asynchronously on the client 401 thereby making the final image displayed seem chaotic or jumbled.

A bulk compressor 450 can be used to compress the graphics primitives prior to sending the stream of data to the client 401. In an embodiment the bulk compressor 450 can be a user mode (not shown) or kernel mode component of the stack instance 414 and can be configured to look for similar patterns within the stream of data that is being sent to the client 401. In this embodiment, since the bulk compressor 450 receives a stream of vertices, instead of receiving multiple API constructs, from multiple applications, the bulk compressor 450 has a larger data set of vertices to sift through in order to find opportunities to compress. That is, since the vertices for a plurality of processes are being remoted, instead of diverse API calls, there is a larger chance that the bulk compressor 450 will be able to find similar patterns in a given stream.

In an embodiment, the graphics processing unit 112 may be configured to use virtual addressing instead of physical addresses for memory. Thus, the pages of memory used as buffers can be paged to system RAM or to disk from video memory. The stack instance 414' can be configured to obtain the virtual addresses of the buffers and send the contents from the virtual addresses when a render command from the graphics kernel 528 is captured.

An operating system 400 may be configured, e.g., various subsystems and drivers can be loaded to capture primitives and send them to a remote computer such as client 401. Similar to that described above, a session manager 416 can be executed by a logical processor 102 and a session that includes certain remote components can be initialized. In this example the spawned session can include a kernel 418, a graphics kernel 524, a user mode display driver 522, and a kernel mode display driver 530.

A graphics kernel may schedule GPU operations. The GPU scheduler 528 can merge separate buffers of vertices into the correct execution order such that the graphics processing unit of the client 401 executes the commands in an order that allows them to be rendered correctly.

All of these variations for implementing the above mentioned partitions are just exemplary implementations, and nothing herein should be interpreted as limiting the disclosure to any particular virtualization aspect.

Adaptive Grid Generation

In a virtual desktop or remote presentation session, the user graphics and video may be rendered at the server for each user. The resulting bitmaps may then be sent to the client for display and interaction. To reduce the bandwidth requirements on the network, bitmaps may be compressed before sending to the client. It is desirable that the compression technique be efficient with low latency.

A remote presentation system may be configured to encode and decode bitmaps and other graphics data. The encoding system may include a tiling system with a tiling module that initially divides source image data into data tiles. A frame differencing module may then output only altered data tiles to various processing modules that convert the altered data tiles into corresponding tile components. A quantizer may perform a compression procedure upon the tile components to generate compressed data according to an adjustable quantization parameter. An adaptive entropy encoder selector may then select one of a plurality of entropy encoders to perform an entropy encoding procedure to thereby produce encoded data. The entropy encoder may also utilize a feedback loop to adjust the quantization parameter in light of current transmission bandwidth characteristics. The process of compressing, encoding and decoding graphics data as referred to herein may generally use one or more methods and systems described in commonly assigned U.S. Pat. No. 7,460,725 entitled "System And Method For Effectively Encoding And Decoding Electronic Information" and U.S. application Ser. No. 12/399,302 entitled "Frame Capture, Encoding, And Transmission Management" filed on Mar. 6, 2009, hereby incorporated by reference in their entirety.

In various methods and systems disclosed herein, improvements to the processing and handling of the various processes described above may be used to provide more efficient processing and thus a more timely and rich user experience. The embodiments disclosed herein for rendering, encoding and transmitting graphics data may be implemented using various combinations of hardware and software processes. In various embodiments, functions may be executed entirely in hardware, entirely in software, or using a combination of hardware and software processes. Such processes may further be implemented using one or more CPUs and/or one or more specialized processors such as a graphics processing unit (GPU) or other dedicated graphics rendering devices.

Furthermore, while the following descriptions are provided in the context of remote presentation systems, it should be understood that the disclosed embodiments may be implemented in any type of system in which graphics data is encoded and compressed for delivery over a network.

Various embodiments may incorporate the use of the discrete wavelet transform (DWT) function for transforming individual YUV components of the tiles into corresponding YUV the subbands. A quantizer function may perform a quantization procedure by utilizing appropriate quantization techniques to compress the tile subbands. The quantizer function may produce compressed image data by reducing the bit rate of the tiles according to a particular compression ratio that may be specified by an adaptive quantization parameter received via a feedback loop from an entropy encoder.

In one embodiment, a GPU may be provided a bitmap with changed rectangles that need to be compressed. The bitmap may be further split into logical tiles and only tiles that change within the changed rectangle are encoded and compressed. In this manner, the process effectively implements a caching scheme in concert with the client where the resulting decoded image is maintained and displayed.

Remote presentation compression algorithms may be employed to reduce the bandwidth of the display stream to levels that are acceptable for transmission over local area networks, wide area networks, and low-bandwidth networks. Such algorithms typically trade off CPU time on the server side for a lower desired bandwidth.

Image compressors may be used that may employ a phase called an entropy coder. An entropy encoder function may perform an entropy encoding procedure to generate encoded data. In certain embodiments, the entropy encoding procedure further reduces the bit rate of the compressed image data by substituting appropriate codes for corresponding bit patterns in the compressed image data received from the quantizer.

One issue that may arise is providing efficient bandwidth usage when parts of the screen are updated often such as, for example, when playing back video or animation. Another issue is the tracking of areas of the screen that have different update speeds. It is desirable in such situations to support staged encoding and thus reduce the bandwidth usage. For example, video or animation playback may be embedded in a window that contains high resolution content surrounding the video (e.g., text). If staged encoding is performed on the part of the window that contains both contents, worse quality may result for the high quality image because the algorithm will treat both areas in the same manner even though the high quality part does not update as often as the video playback sub-portion.

Figure 7:
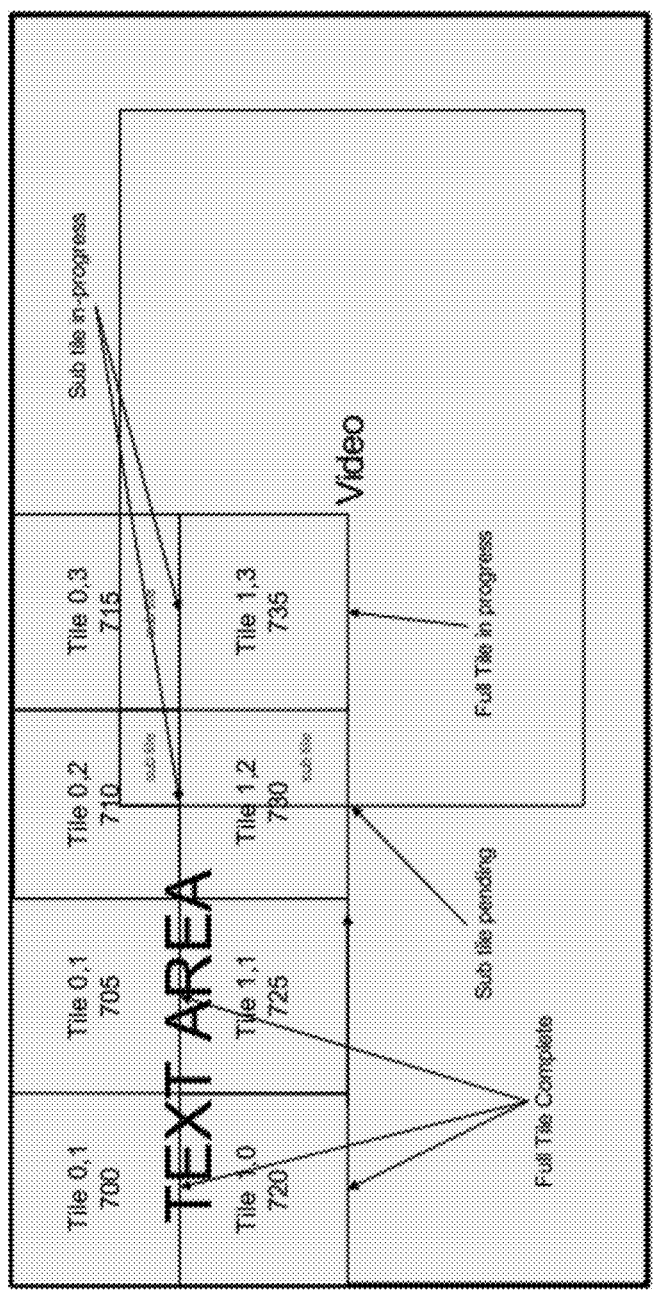
FIG. 7 illustrates an example of a screen tiling implementation.

FIG. 7 illustrates an example diagram depicting a screen with different update rates. Tiles 0,0 (700); 0,1 (705); 1,0 (720); and 1,1 (725) contain text only which is not updated frequently. Tile 1,3 (735) is video only which is updated frequently. Tiles 0,2 (720); 0,3 (715); and 1,2 (735) are a mix of both. If the mixed tiles are treated as "text only," the video portion may be of high quality and static, i.e. the tile will not update as often as the "video" only tiles. If the mixed tiles are treated as "video only" and the bandwidth is reduced for sending the data, the text will be of lower quality than the text tiles.

When performing bit mapped encoding, effective bit map caching and content classification can greatly improve the performance of remote presentation systems. Many remote presentation protocols use techniques such as classification of image regions as text or images and caching tiles to optimize network performance. Typically such techniques are applied to the screen on a fixed tile grid which may result in disadvantages for:

a) Classification—certain tiles contain a mixture of both image and text b) Caching—the origin of the grid is aligned to the screen so any moving of windows will likely lead to mismatches in the cache.

In some of the tile based schemes described above, a fixed grid that starts at the screen origin is typically used. In bit map caching, tiles are stored in cache and when a tile in a subsequent frame is identical to a previously cached tile, then the cached tile can be used, which is referred to as a cache hit. However, if a user screen is scrolled or otherwise moved in reference to the screen origin, then it is possible that cache hits will not be identified even if the screen is substantially unchanged.

Figure 8:
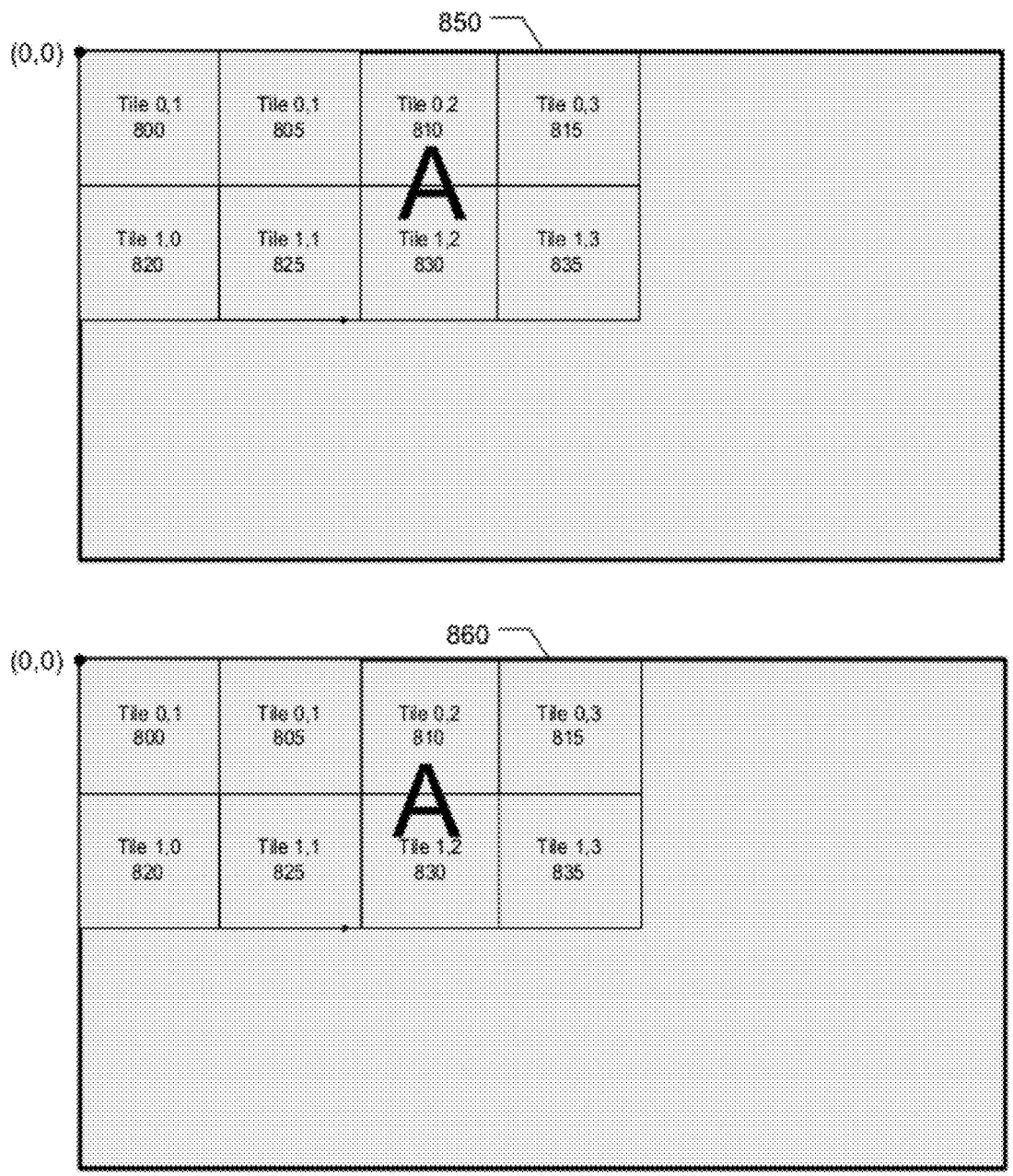
FIG. 8 illustrates an example of a screen tiling implementation.

For example, referring to FIG. 8, the letter A is shown as being rendered on a screen frame with 64×64 tiles. A fixed grid with fixed origin (0,0) is used. In a first frame 850, a hash key may be computed for each tile, for example tiles 810 and 830 that encompass the letter A. A hash key may be computed for each tile including tiles 810 and tile 830. If, in the next frame, a tile with the same hash as tile 810 is used, then you have a cache hit situation and the cached tile for tile 810 may be used rather than a newly encoded tile. However, if in a second frame 860 the screen has been scrolled up by only one pixel and the same fixed grid scheme is used with fixed origin (0,0), then the hash keys for the tiles may change and you would not get the cache hits even when the frame is substantially similar to the previous frame. For example, in frame 860 the letter A is still encompassed by tiles 810 and 830, but the hash keys for tiles 810 and 830 in frame 860 no longer match those of tiles 810 and 830 in frame 850.

Another problem that may arise in remote presentation systems is that classifiers may be used to analyze a screen frame to determine an appropriate codec to encode a tile depending on the content of the tile. When using a fixed grid without regard to the actual contents of the frame, the result may be that some tiles contain both text and image. The classifier may, as a result, select a less optimal encoder at least for portions of the tile when the tile has mixed content.

In various embodiments, methods and systems are disclosed for generating a more suitable grid for use in both caching and classification. Such a grid may have the property that it is aligned to screen content such as user interface elements and borders between images and text. In some embodiments, an algorithm may be used that analyzes a screen and generates a subdivision grid of the screen that is likely to partition the screen into areas that substantially separate image and text content. This subdivision grid can also be further sub-divided (i.e., tiled) into regions that may be better suited for caching. In further embodiments, the algorithm may produce the grid using information from a window manager regarding window hierarchies and user interface element placement. Accordingly, a more adaptable grid may be provided that is aligned to the major user interface elements of a screen frame. By using such an adaptive grid rather than a general fixed grid, an adaptable grid fixed to the windows of a screen may provide more origins that are aligned to allow for tiles that are aligned to the dominant screen areas.

Figure 10:
FIG. 10 illustrates an example screen illustrating aspects of the methods disclosed herein.
Figure 11:
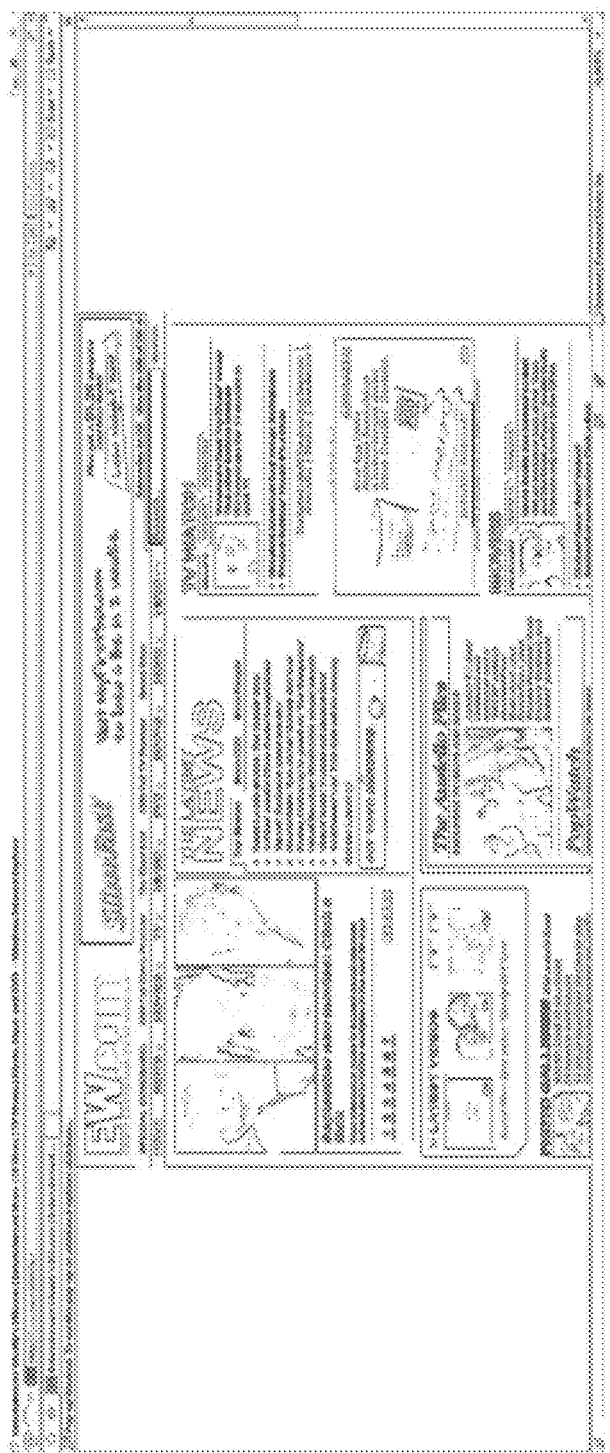
FIG. 11 illustrates an example screen illustrating aspects of the methods disclosed herein.

In an embodiment, an adaptable grid algorithm may be a heuristic algorithm for providing a grid that is substantially matched to the content. In an illustrative embodiment, a method for implemented an adaptable grid algorithm may include receiving a screen frame and computing an edge map. For example, a frame such as that shown in FIG. 10 may be received for encoding and transmitting to a client. A number of techniques for determining an edge map is known to those skilled in the art and may be used in conjunction with the present disclosure. Such a technique may be used to determine the location of sharp edges in the image such as edges of windows images and user interface elements. An edge map may comprise a binary image wherein 1's represent the edges. For example, FIG. 11 depicts one possible edge map based on the screen frame depicted in FIG. 10. Such an edge map may then be used to compute the grid.

In one embodiment, an adaptable grid may be determined as follows. First, the edge map may be searched for long edges. A predetermined threshold may be used as a criterion for a long edge. The algorithm may then search for corners or intersections between long horizontal edges and long vertical edges. In an embodiment, the algorithm may account for visual corners that may not actually intersect by using a predetermined constraint or tolerance. For example, a horizontal edge and a vertical edge may create a corner with a small gap such as a rounded corner or a gapped corner. Nevertheless, such "intersections" are not ignored in this algorithm.

Figure 9:
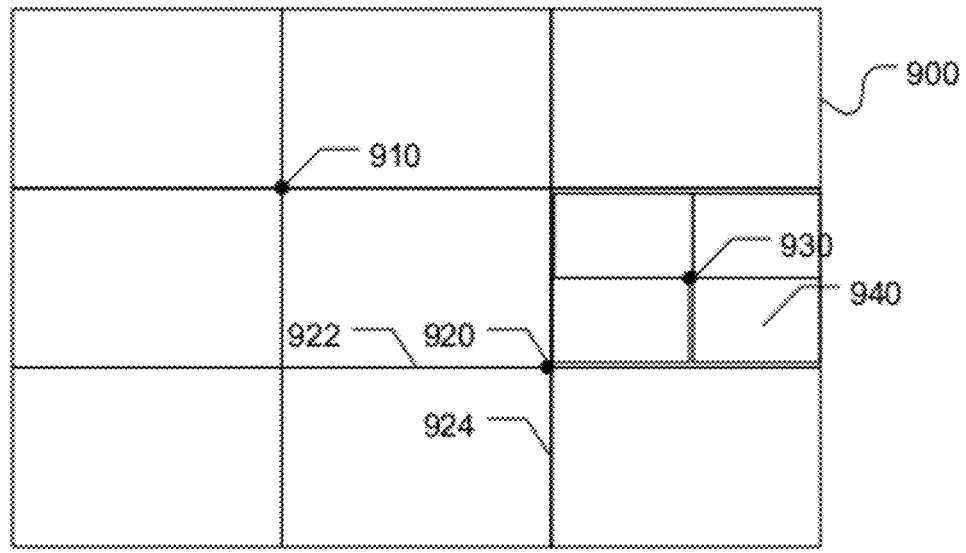
FIG. 9 illustrates examples methods of an adaptive grid generation scheme.
Figure 9:
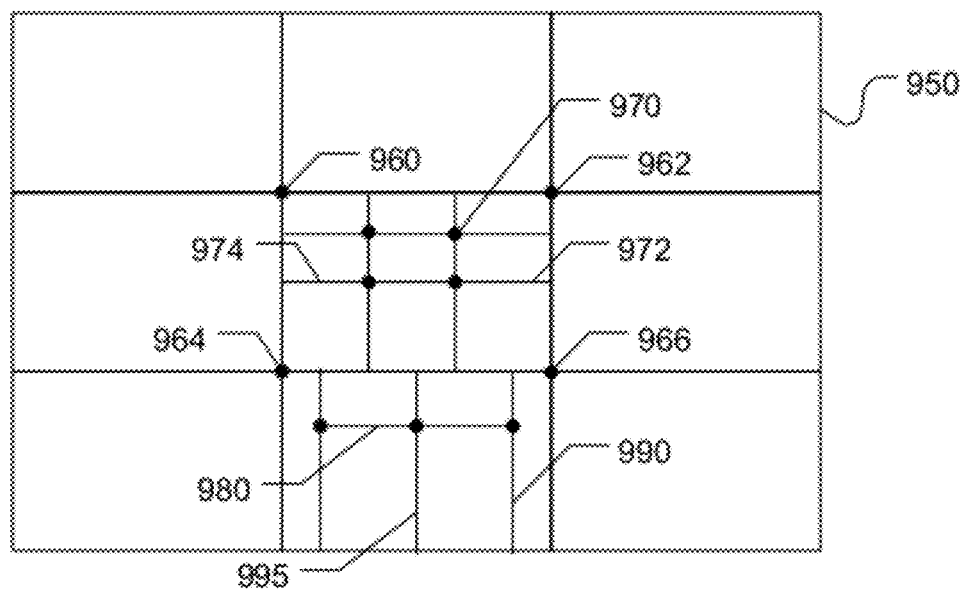

After the corners are determined, the result is that the screen is now divided into a number of rectangular areas using the horizontal edges and the vertical edges and the determined corners. The areas defined by the corners may be used to further subdivide the screen, first split horizontally then vertically, so that one space becomes four spaces. For example, referring to FIG. 9, screen 900 may determine anchor points 910 and 920 based on an edge map discovery process. A horizontal division 922 and vertical division 924 may be used to subdivide the screen. A further anchor point 930 within one of the four created subdivisions 940 may be used to further subdivide the subdivision. In an embodiment, a tree structure may be used to subdivide the spaces. For example, binary space partitioning (BSP) may be used to recursively subdivide the screen into convex sets. This subdivision results in a representation of the screen using a tree data structure referred to as a BSP tree. However, other methods of partitioning may be used within the scope of the present disclosure. Continuing with the algorithm, if there is another corner, then the algorithm may define the space that the corner is in and subdivide only some spaces.

Figure 12:
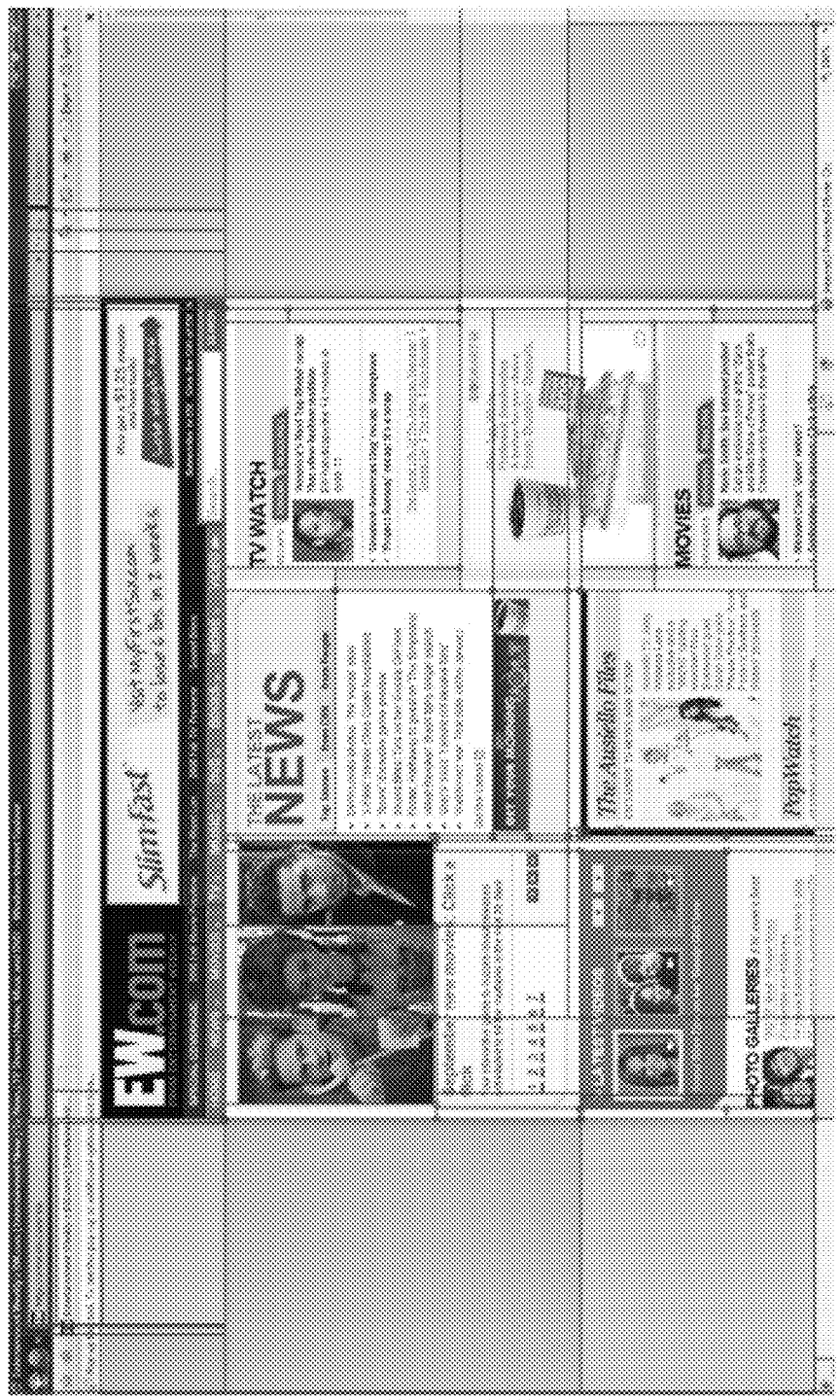
FIG. 12 illustrates an example screen illustrating aspects of the methods disclosed herein.

By using the above described procedure, a grid may be determined that is aligned to the outside windows and the images inside the windows. FIG. 12 illustrates an example grid determined using the above algorithm using the screen frame depicted in FIG. 10.

The choice of the first corner may affect the outcome of the algorithm. Accordingly, the algorithm may prioritize the corners based on the length of the edges. For example, if a long edge intersects to create a corner, then that corner is weighted accordingly.

In addition to using the corners, additional edges may be used to provide for further subdivisions. For example, the N longest edges longer than a predetermined value may be used. For example, a horizontal non-intersecting edge that is longer than N may be selected and used as a subdivision point. In an embodiment, the two endpoints may be used as vertical splits, and the center point of the edge may be used as a horizontal split. By using this scheme, a more effective grid may be computed that corresponds to typical windows used in many remote presentation scenarios. As an example, referring to FIG. 9, in screen 950 a long horizontal and non-intersecting edge 980 may be included in the edge map that is longer than a threshold N. Vertical splits 990 may be formed based on the endpoints of non-intersecting edge 980, and vertical split 995 may be determined from the center point of non-intersecting edge 980.

Starting points for subdividing a screen using intersections and longest edges may be referred to as anchors. In other embodiments, other screen elements may be used as anchors. For example, as an alternative or in addition to an algorithmic approach, specific knowledge of the structure of the windows of the screen may be used. For example, the underlying operating system may be able to provide specific information regarding the geometry of the objects on the screen. Such information may be provided in response to queries from the remote presentation system. This information may be used to augment the algorithmic method described above or used in lieu of the algorithm.

The following provides an illustrative example of one algorithm incorporating some of the aspects described above:

For screen area that is updated:
  a. Compute a Sobel based edge map based on the pixel LUMA values. A Sobel operator is a discrete differentiation operator that computes an approximation of the gradient of the image intensity function. The result indicates how abruptly or smoothly an image changes at a point. LUMA represents the brightness in an image.
  b. Look for horizontal edge runs longer than a threshold KRunLength
  c. Look for vertical edge runs longer than a threshold KRunLength
  d. Compute the intersection points of these Horiz and Vert edge runs with a tolerance KDelta
  e. Sort the intersection points to favor those points formed by longer edges
  f. Subdivide the screen using a quadtree division scheme at each of the intersection points. Use a criterion to avoid creating subdivisions smaller than KArea (by area and/or length)
  g. Select the KTop longest horizontal edges and further add subdivisions of the screen based on these edge points and the center points
  h. Walk the resulting tree to produce a division grid for the screen i. Use this grid as the basis for both where image classification is applied and as origin points for tiling the screen for caching.

Figure 13:
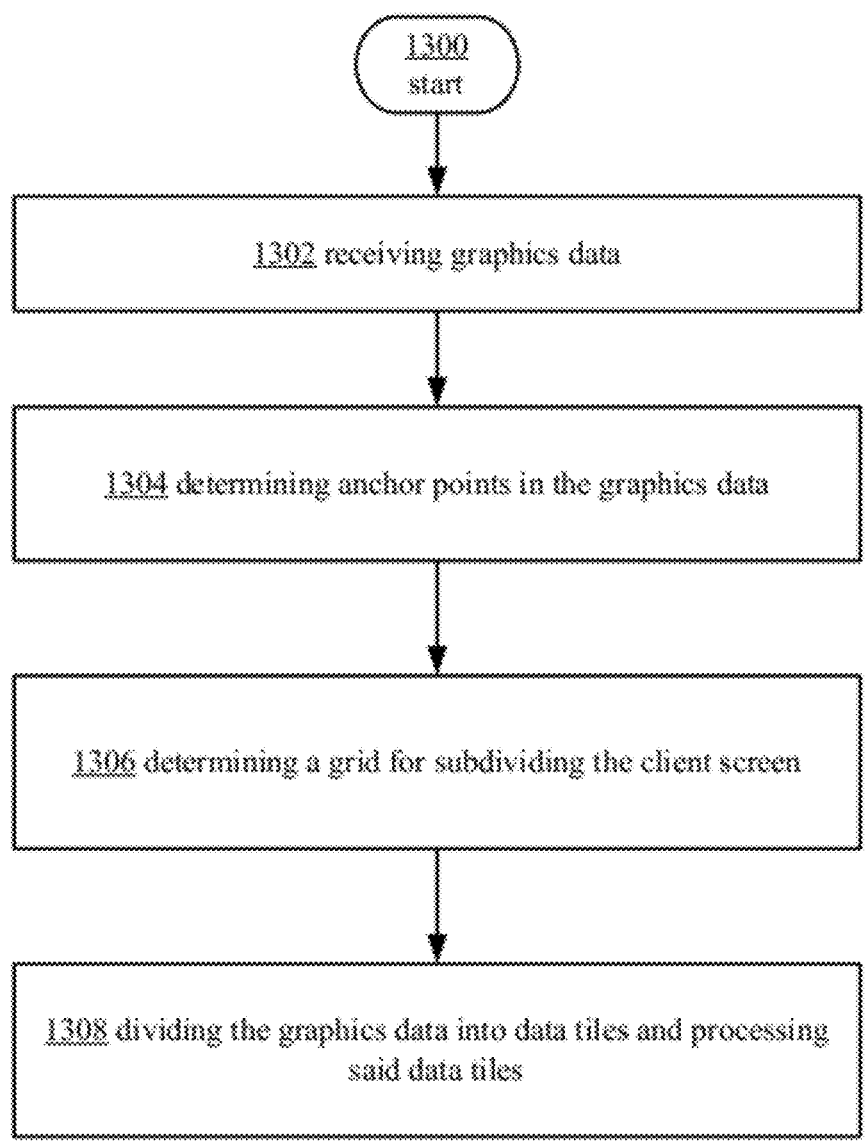
FIG. 13 illustrates an example of an operational procedure for processing graphics data for transmission to a remote computing device.

FIG. 13 depicts an exemplary operational procedure for processing graphics data for transmission to a remote computing device including operations 1300, 1302, 1304, 1306, and 1308. Referring to FIG. 13, operation 1300 begins the operational procedure and operation 1302 illustrates receiving graphics data representative of a client screen to be transmitted to the remote computing device. Operation 1304 illustrates determining anchor points in the graphics data, wherein the anchor points are indicative of transitions between visual elements of the client screen. Operation 1306 illustrates based on the anchor points, determining a grid for subdividing the client screen, wherein the grid is substantially aligned to user interface elements and border between images and text of said client screen. Operation 1308 illustrates based on the grid, dividing the graphics data into data tiles and processing said data tiles for transmission to the remote computing device. In some embodiments, the procedure includes receiving information describing window hierarchies and user interface element placement, wherein the anchor points are based on the received information.

Figure 14:
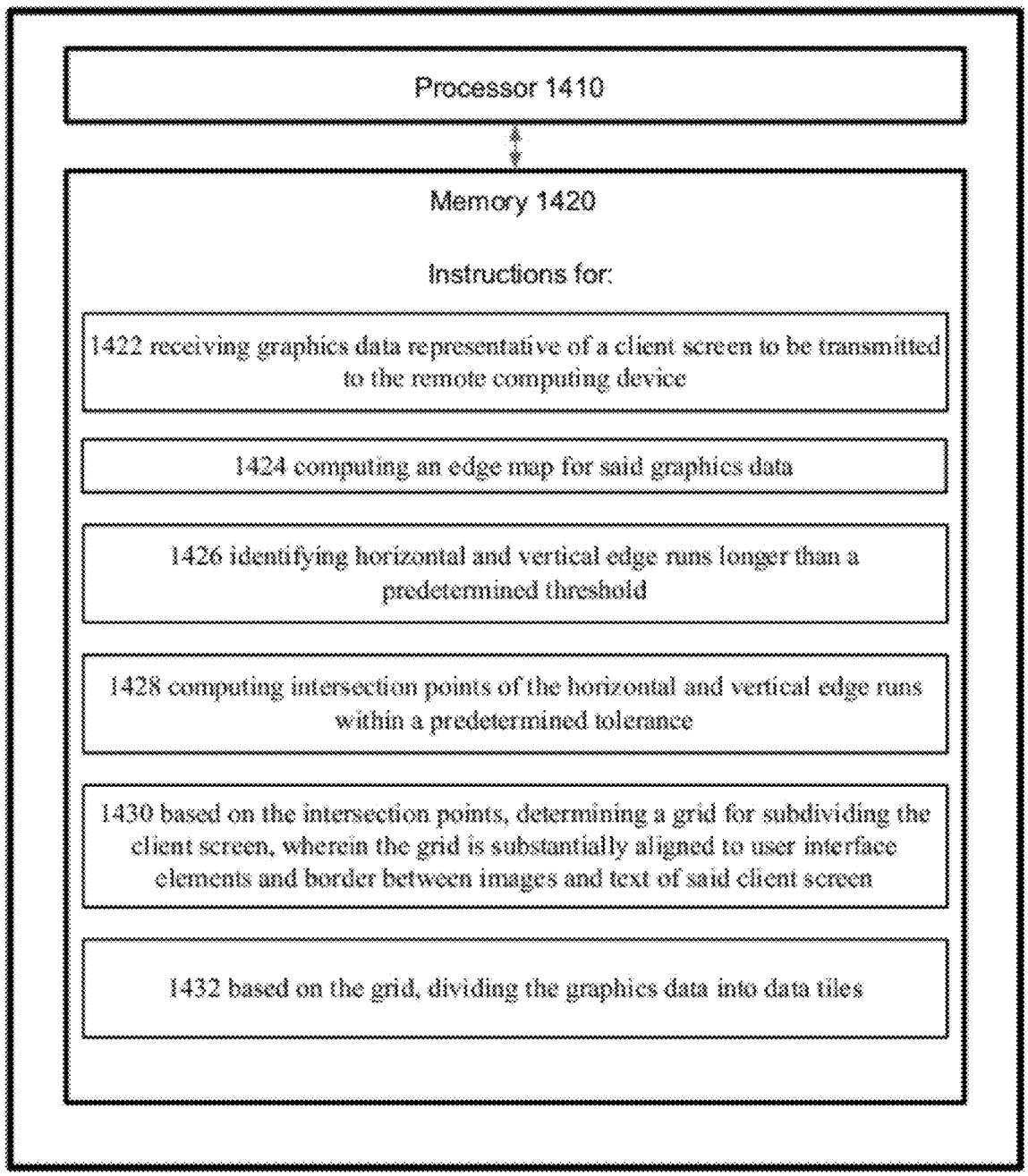
FIG. 14 illustrates an example system for processing graphics data for transmission to a remote computing device.

FIG. 14 depicts an exemplary system for processing graphics data for transmission to a remote computing device as described above. Referring to FIG. 14, system 1400 comprises a processor 1410 and memory 1420. Memory 1420 further comprises computer instructions configured to process graphics data for transmission to a plurality of client computers. Block 1422 illustrates receiving graphics data representative of a client screen to be transmitted to the remote computing device. Block 1424 illustrates computing an edge map for said graphics data. Block 1426 illustrates identifying horizontal and vertical edge runs longer than a predetermined threshold. Block 1428 illustrates computing intersection points of the horizontal and vertical edge runs within a predetermined tolerance. Block 1430 illustrates based on the intersection points, determining a grid for subdividing the client screen, wherein the grid is substantially aligned to user interface elements and border between images and text of said client screen. Block 1432 illustrates based on the grid, dividing the graphics data into data tiles.

Any of the above mentioned aspects can be implemented in methods, systems, computer readable media, or any type of manufacture. For example, a computer readable medium can store thereon computer executable instructions for processing graphics data for transmission to a client computer. Such media can comprise a first subset of instructions for receiving graphics data representative of a client screen to be transmitted to the remote computing device; a second subset of instructions for determining anchor points in the graphics data, wherein the anchor points are indicative of transitions between visual elements of the client screen; a third set of instructions for, based on the anchor points, determining a grid for subdividing the client screen, wherein the grid is substantially aligned to user interface elements and border between images and text of said client screen; and a fourth set of instructions for, based on the grid, dividing the graphics data into data tiles and processing said data tiles for transmission to the remote computing device. It will be appreciated by those skilled in the art that additional sets of instructions can be used to capture the various other aspects disclosed herein, and that the four presently disclosed subsets of instructions can vary in detail per the present disclosure.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed:

1. A method of processing graphics data for transmission to a remote computing device, the method comprising:
    receiving graphics data representative of a client screen to be transmitted to the remote computing device;
    determining anchor points in the graphics data, wherein the anchor points are indicative of intersections of edges in the client screen;
    based on the anchor points, determining a grid for subdividing the client screen, wherein the grid is aligned to user interface elements and borders between image and text areas of said client screen;
    subdividing the graphics data into data tiles in accordance with the grid so that the tiles correspond to subdivided portions of the client screen and each tile contains primarily image data or text data but not both; and
    processing said data tiles for transmission to the remote computing device by processing the data tiles into tile components and encoding the tile components to produce encoded data outputs, said processing based on whether the data tiles contain primarily image data or text data.

2. The method of claim 1, further comprising subdividing the data tiles into regions that are optimized, according to a predetermined threshold, for caching.

3. The method of claim 1, further comprising classifying said data tiles.

4. The method of claim 1, further comprising receiving information describing window hierarchies and user interface element placement, wherein said anchor points are based on the received information.

5. The method of claim 1, wherein said determining further comprises:
computing a sobel based edge map based on pixel LUMA values in said graphics data; and
identifying horizontal and vertical edge runs longer than a predetermined threshold.

6. The method of claim 5, further comprising computing intersection points of the horizontal and vertical edge runs within a predetermined tolerance.

7. The method of claim 6, further comprising sorting the intersection points according to intersection points formed by longer edges.

8. The method of claim 7, wherein said dividing comprises dividing the client screen using a tree-based division scheme at each of the intersection points.

9. The method of claim 8, wherein a predefined criterion is used to avoid creating divisions smaller than a minimum area or length.

10. The method of claim 9, further comprising selecting a predetermined number of longest horizontal edges and subdividing the client screen based on edge points and center points of the predetermined number of longest horizontal edges.

11. The method of claim 8, wherein said dividing further comprises walking the resulting tree to produce a division grid for the screen.

12. A system for processing graphics data for transmission to a remote computing device, comprising:
a computing device comprising at least one processor;
a memory communicatively coupled to said processor when said system is operational; said memory having stored therein computer instructions that upon execution by the at least one processor cause:
receiving graphics data representative of a client screen to be transmitted to the remote computing device;
computing an edge map for said graphics data;
identifying horizontal and vertical edge runs longer than a predetermined threshold;
computing intersection points of the horizontal and vertical edge runs within a predetermined tolerance;
based on the intersection points, determining a grid for subdividing the client screen, wherein the grid is aligned to user interface elements and border between images and text of said client screen; and
subdividing the graphics data into data tiles in accordance with the grid so that the tiles correspond to subdivided portions of the client screen and the tiles contain primarily image data or text data but not both; and
processing the data tiles into tile components and encoding the tile components to produce encoded data outputs, said processing based on whether the data tiles contain primarily image data or text data.

13. The system of claim 12, further comprising sorting the intersection points according to intersection points formed by longer edges.

14. The system of claim 13, wherein said dividing comprises dividing the client screen using a tree-based division scheme at each of the intersection points.

15. The system of claim 14, wherein a predefined criterion is used to avoid creating divisions smaller than a minimum area or length.

16. The system of claim 15, further comprising selecting a predetermined number of longest horizontal edges and subdividing the client screen based on edge points and center points of the predetermined number of longest horizontal edges.

17. A tangible computer readable storage medium storing thereon computer executable instructions for processing graphics data for transmission to a client computer, said instructions for:
receiving graphics data representative of a client screen to be transmitted to the client computer;
determining anchor points in the graphics data, wherein the anchor points are indicative of intersections of edges in the client screen;
based on the anchor points, determining a grid for subdividing the client screen, wherein the grid is aligned to user interface elements and border between image and text areas of said client screen; and
subdividing the graphics data into data tiles in accordance with the grid so that the tiles correspond to subdivided portions of the client screen and each tile contains primarily image data or text data; and
processing said data tiles for transmission to the client computer by processing the data tiles into tile components and encoding the tile components to produce encoded data outputs, said processing based on whether the data tiles contain primarily image data or text data.

18. The tangible computer readable storage medium of claim 17, further comprising instructions for receiving information describing window hierarchies and user interface element placement, wherein said anchor points are based on the received information.

19. The tangible computer readable storage medium of claim 18, further comprising instructions for selecting a predetermined number of longest horizontal edges and subdividing the client screen based on edge points and center points of the predetermined number of longest horizontal edges.

* * * * *